United States Patent [19]

Owen

[11] Patent Number: 4,815,806
[45] Date of Patent: Mar. 28, 1989

[54] STABILIZED LASER FIBER LAUNCHER

[75] Inventor: Kenneth H. Owen, Ridgewell, England

[73] Assignee: Coherent, Inc., Palo Alto, Calif.

[21] Appl. No.: 126,222

[22] Filed: Dec. 4, 1987

[51] Int. Cl.$^4$ ............................ G02B 6/32; H01S 3/10
[52] U.S. Cl. ............................ 350/96.18; 350/96.10; 372/25; 372/703
[58] Field of Search ............................ 350/96.15, 96.18; 372/25, 26, 703

[56] References Cited

U.S. PATENT DOCUMENTS

| | | | |
|---|---|---|---|
| 3,995,230 | 11/1976 | See | 331/94.5 |
| 4,281,891 | 8/1981 | Shinohara et al. | 350/96.18 |
| 4,575,194 | 3/1986 | Streifer et al. | 350/96.18 X |
| 4,627,068 | 12/1986 | Johnson et al. | 372/6 X |
| 4,635,263 | 1/1987 | Mollenauer | 372/6 X |
| 4,676,586 | 6/1987 | Jones et al. | 350/96.15 X |
| 4,723,824 | 2/1988 | Shaw et al. | 372/69 X |

FOREIGN PATENT DOCUMENTS

| | | | |
|---|---|---|---|
| 0033127 | 3/1980 | Japan | 350/96.18 |
| 0021113 | 2/1981 | Japan | 350/96.18 |

*Primary Examiner*—William L. Sikes
*Assistant Examiner*—Akm E. Ullah
*Attorney, Agent, or Firm*—Limbach, Limbach & Sutton

[57] ABSTRACT

A system for launching laser light into an optical fiber, which includes means for suppressing establishment of an interfering standing wave in the laser cavity, either by preventing laser light from reflecting back into the cavity from the fiber, or by preventing light which does reflect into the cavity from the fiber from establishing an interfering standing wave. In a preferred embodiment, the system includes a rod-type lens having a front surface for receiving incident laser light and a back surface, and an optical fiber having an end surface substantially parallel to and coupled with the back surface of the lens, where the angle between the propagation direction of the incident laser light and the normal to the fiber's end surface is sufficiently large so that reflected light from the lens-fiber interface will propagate away from the laser cavity and will not re-enter the laser cavity. Alternative embodiments include means for varying the optical path length between the laser and the fiber, or means for varying the frequency of light propagating between the laser and the fiber, in order to reduce the likelihood that light reflected back into the laser from the fiber will establish an interfering standing wave.

28 Claims, 1 Drawing Sheet

STABILIZED LASER FIBER LAUNCHER

FIELD OF THE INVENTION

The invention relates to systems for launching a laser beam into an optical fiber. More specifically, the invention relates to systems for launching a laser beam into an optical fiber in a manner reducing laser frequency instability caused by laser light reflected back into the laser from the optical fiber, and to components of such systems.

BACKGROUND OF THE INVENTION

In many laser applications involving single mode lasers and optical fibers, it is desirable to launch a beam of laser light having a stable frequency into an optical fiber. To perform this operation, it is necessary to focus the laser beam into the fiber core. A simplified cross-sectional view of a conventional system for accomplishing this operation is shown in FIG. 1. Laser 1 includes a laser cavity of length $L_1$ spanned by partially reflecting mirrors 4 and 5. Light transmitted through mirror 5 is focussed by lens 2 into the core of optical fiber 3.

However, conventional systems such as that shown in FIG. 1 have caused the laser frequency to drift out of control due to reflection of the laser beam from the optical fiber back into the laser cavity. This reflected laser light (represented by light waves B) re-enters the laser cavity along the same path as the incident light (represented by light waves A) exits the laser cavity, so that laser light will tend to propagate as a standing wave in the effective "cavity" between the laser mirror farthest from the fiber (mirror 4) and the end surface of the fiber. Because the length, $L_2$, of such effective cavity exceeds the length, $L_1$, of the actual laser cavity spanned by the laser mirrors, the laser stabilization control system will respond as if the length of the actual cavity had increased. The stabilization control system will thus attempt to compensate for the apparent cavity length increase, causing the laser frequency to drift out of control. For many applications, such as where the laser light is used in an interferometer system, extremely small amounts of frequency drift may be unacceptable. In a typical conventional system, if as little as less than 0.1% of the laser output re-enters the laser cavity as a result of such a back reflection, unacceptable frequency drift results. Because such a small amount of back reflection may cause undesirable frequency drift, conventional laser isolators and highly efficient conventional antireflection coatings on the optical components between the laser cavity and the optical fiber are unsuitable for reducing such frequency drift to acceptable levels.

SUMMARY OF THE INVENTION

The invention is a system for launching laser light into an optical fiber, which includes means for suppressing establishment of an interfering standing wave in the laser cavity of a laser supplying the laser light, either by preventing laser light from reflecting back into the cavity from the fiber, or by preventing light which does reflect into the cavity from the fiber from establishing an interfering standing wave. In a preferred embodiment, the system includes a rod-type lens having a front surface for receiving incident laser light and a back surface, and an optical fiber having an end surface substantially parallel to and coupled with the back surface of the lens, where the angle between the propagation direction of the incident laser light and the normal to the fiber's end surface is sufficiently large so that reflected light from the lens-fiber interface will propagate away from the laser cavity and will not re-enter the laser cavity. Preferably, the refractive indices of the adjacent portions of the lens and fiber are selected so as to reduce the amount of light reflected at the lens-fiber interface, and lens is bonded to the fiber using an index matching adhesive. Preferably, the lens is a graded index, rod-type lens.

An alternative embodiment of the inventive system includes means for varying the optical path length between the laser and the fiber, in order to reduce the likelihood that light reflected back into the laser from the fiber will establish an interfering standing wave. In another alternative embodiment, the inventive system includes means for varying the frequency of light propagating between the laser and the fiber, in order to reduce the likelihood that light reflected back into the laser from the fiber will establish an interfering standing wave. In this latter embodiment, the frequency varying means is preferably an acousto-optical modulator.

DETAILED DESCRIPTION OF THE PREFERRED EMBODIMENTS

Figure 2:
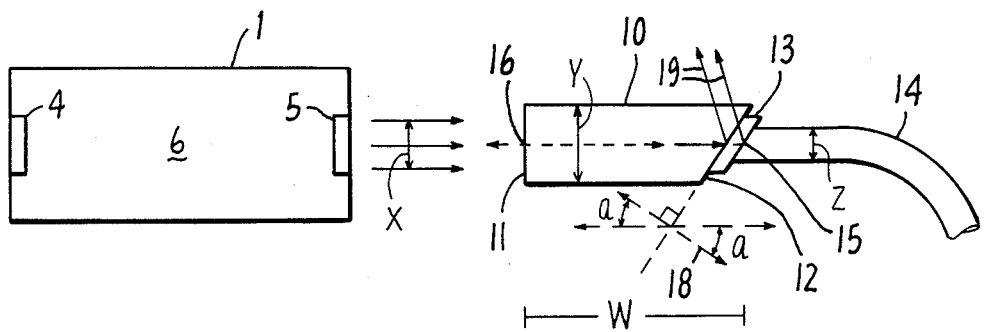
FIG. 2 is a simplified cross-sectional view of a preferred embodiment of the inventive system.

A preferred embodiment of the invention is shown in FIG. 2. Light transmitted through partially reflecting mirror 5 of conventional laser 1 is incident at front surface 11 of rod-type lens 10. A portion of this incident light is transmitted through back surface 12 of lens 10, through adhesive 13, and through end surface 15 of optical fiber 14 into fiber 14. Back surface 12 and end surface 15 are substantially parallel, and are oriented so that the normal (represented by arrow 18) to each surface is oriented at a non-zero angle "a" with respect to the propagation direction of the incident light (which is parallel to the longitudinal axis of lens 10). Angle a is selected to have sufficient magnitude so that light reflecting from surfaces 12 and 15 (represented by light waves 19) will propagate away from mirror 5 of laser 1, and preferably so that no significant amount of reflected light will re-enter laser cavity 6 in such a manner as to establish a standing wave interfering with the ordinary standing wave propagating between mirrors 4 and 5 within cavity 6.

Preferably, the refractive indices of lens 10, fiber 14, and any material disposed therebetween (such as adhesive 13) are chosen so as to minimize the reflection of incident laser light at surfaces 11, 12, and 15. Lens 10 is preferably a graded index lens having refractive index which varies with radial distance from central longitudinal axis 16 of lens 10. Alternatively, rod lens 10 may be of the conventional refraction type. Reflections from surface 11 of lens 10 may be reduced by any conventional means, such as an anti-reflection coating. Preferably, the portion of lens 10 near surface 12 has refractive index (or refractive index profile) which matches that of fiber 14. In an embodiment in which lens 10 is bonded to fiber 14 by adhesive 13, the refractive index of adhesive 13 will preferably match that of fiber 14 and the portion of lens 10 near surface 12. In an alternative embodiment, lens 10 and fiber 14 may be connected together using conventional mechanical means, and an index matching medium (which may be a liquid) fills the space between surface 12 of lens 10 and surface 15 of fiber 14.

The optimal absolute magnitude of angle a depends on the diameter X of the laser beam and on the length W of lens 10. More specifically, angle a should not have absolute magnitude less than the quantity:

$$a_{min} = [(\text{Arctan}(X/W))/2] \quad (1)$$

For example, if x/w is equal to 1/10, the absolute magnitude of angle a should be greater than or equal to about 3 degrees. It should be appreciated that angle a may be positive or negative, so that in the example, angle a may be less than negative three degrees, or greater than positive three degrees. For practical purposes, it is also acceptable to use the diameter of lens 10 as the parameter X in equation (1) set forth above, rather than the diameter of the laser beam.

In one preferred embodiment, lens lo is a graded index rod-type lens known as Selfoc (available from Nippon Glass) having diameter 1.88 mm, length 10 mm, and focal length 4.63 mm. In this embodiment, fiber 14 is a single mode fiber having numerical aperture (N.A.) equal to 0.12 and is capable of maintaining the plane of polarization of the laser light, laser 1 is a single frequency stabilized HeNe laser with a beam diameter of 0.64 mm, and the angle a is equal to five degrees. In this embodiment, we have achieved laser frequency stability of 1 part in $10^7$ during the operation of launching laser light into the fiber.

Figure 3:
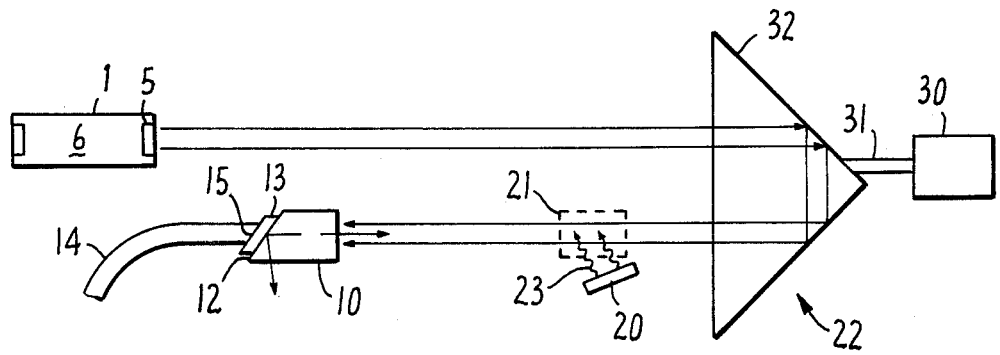
FIG. 3 is a simplified cross-sectional view of another preferred embodiment of the inventive system.

Alternative embodiments of the invention include alternative means for maintaining laser frequency stability during the operation of launching laser light into the fiber. One such alternative embodiment is shown in FIG. 3. The FIG. 3 system includes two such alternative means, each of which maintains frequency stability in a manner other than by directing reflections from surfaces 12 and 15 away from laser 1. FIG. 3 includes all the components of the FIG. 2 system and in addition, frequency shifting unit 20 and variable optical path length unit 22.

Unit 20 shifts the frequency of light propagating through interaction region 21, so that light reflected back into laser cavity 6 from lens 10 or fiber 14 will have a different frequency than it originally had when it first emerged from cavity 6. In a preferred embodiment, unit 20 includes an acousto-optic modulator capable of launching acoustic waves 23 into the path of laser light propagating through region 21, so that the acoustic waves and the laser light will interact in interaction region 21. In a manner well known in the art, one or more acoustic waves having appropriate frequency and incidence angle may be introduced by modulator 20 into the interaction region so as to cause the frequency of laser light emerging from acousto-optic interaction region 21 to differ from that of laser light entering region 21. Such laser light frequency shift will prevent laser light reflected from lens 10 or fiber 14 from establishing a standing wave between mirror 4 and the reflecting surface (on lens 10 or fiber 14) which will interfere with the standing wave ordinarily existing between mirrors 4 and 5. Frequency shifting unit 20 may alternatively include any other conventional means for shifting the frequency of the laser light propagating past or through unit 20.

Variable optical path unit 22 also prevents laser light reflected from lens 10 or fiber 14 from establishing an interfering standing wave (of the type defined in the previous paragraph) but does so in a different manner than does modulator 20. Variable optical path unit 22 is a means for changing the optical path length of laser light propagating between laser 1 and lens 10. For example, as shown in FIG. 3, unit 22 may include an optical reflector 32 capable of reflecting incident light (either light emerging from laser 1 or reflected light from lens 10) by an angle substantially equal to 180 degrees. The position of reflector 32 relative to laser 1 and lens 10 may be varied by translating member 31, and reflector 32 attached to member 31, relative to unit 30. For example, member 31 may be a screw and unit 30 may include conventional means for rotating the screw. By varying the optical path length of any light propagating between lens 10 and laser 1, sufficient perturbations may be established to decrease the likelihood that an interfering standing wave will be established.

Figure 1:
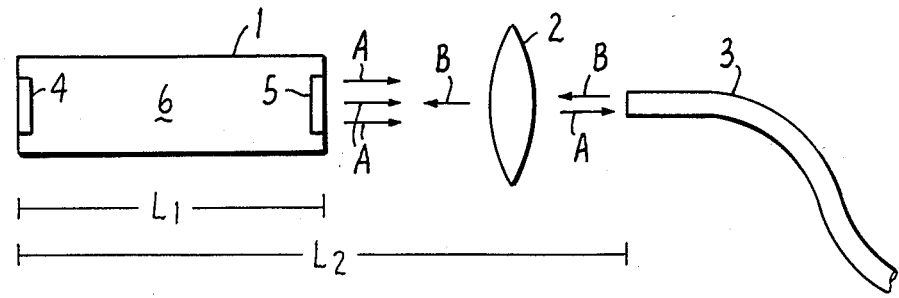
FIG. 1 is a simplified cross-sectional view of a conventional system for launching a laser beam into an optical fiber.

Variations on the FIG. 3 system in which either or both of units 20 and 22 are omitted, are within the scope of the invention. For example, unit 22 may be omitted and lens 10 oriented so as to receive light propagating to the right from laser 1, as in FIG. 2, after such laser light passes from left to right through interaction region 21 associated with unit 20. It is also within the scope of the invention to replace the preferred lens-fiber unit in the FIG. 3 embodiment (which includes angled rod lens 10 and angled fiber 14) by a conventional lens-fiber combination (such as lens 2 and fiber 3 shown in FIG. 1).

The foregoing disclosures and description of the invention are merely illustrative and explanatory thereof. Various changes in the size, shape, and materials of construction, as well as in the details of construction and operation, may be made within the scope of the appended claims.

What is claimed is:

1. A system for receiving laser light from a laser having a laser cavity in which a standing wave propagates, and coupling the laser light into an optical fiber, including:
   (a) an optical fiber;
   (b) a lens for receiving laser light from the laser and directing the received laser light into the optical fiber; and
   (c) means for maintaining laser frequency stability by preventing laser light reflected from the fiber from establishing an interfering standing wave in the laser cavity.

2. The system of claim 1, wherein element (c) is a means for directing laser light reflected from the fiber away from the laser so that such reflected light does not re-enter the laser cavity.

3. The system of claim 1, wherein element (c) includes:
   (d) means for preventing light which reflects into the cavity from the fiber from establishing the interfering standing wave.

4. The system of claim 3, wherein element (d) includes:
   (e) means for varying the optical path length between the laser and the fiber.

5. The system of claim 3, wherein element (d) includes:

(f) means for changing the frequency of light propagating between the laser and the fiber.

6. The system of claim 5, wherein element (f) includes an acousto-optical modulator.

7. The system of claim 1, wherein element (b) is a rod-type lens having a front surface for receiving incident laser light and a back surface, and element (a) is an optical fiber having an end surface substantially parallel to and coupled with the back surface of the lens, where the angle between the propagation direction of the laser light received by the lens and the normal to the fiber's end surface has absolute magnitude sufficiently large so that reflected light from the lens-fiber interface will propagate away from the laser cavity and will not re-enter the laser cavity.

8. The system of claim 7, wherein the lens is a graded index rod-type lens.

9. The system of claim 7, wherein the lens is a graded index rod-type lens having length substantially equal to 10 mm, the fiber is a single mode fiber having numerical aperture substantially equal to 0.12, the lens receives a beam of laser light having a beam diameter substantially equal to 0.64 mm, and the angle has absolute magnitude not less than five degrees.

10. The system of claim 7, wherein the lens has length W, a beam of laser light having beam diameter X is incident at the lens, and the angle between the propagation direction of the laser light received by the lens and the normal to the fiber's end surface has absolute magnitude not less than the quantity: $[(\text{Arctan}(X/W))/2]$.

11. A system for launching laser light into an optical fiber, including:
(a) a laser, having a laser cavity in which a standing wave propagates, and capable of emitting laser light from the cavity;
(b) an optical fiber;
(c) a lens for receiving laser light from the laser and directing the received laser light into the optical fiber; and
(d) means for maintaining laster frequency stability by preventing laser light reflected from the fiber from establishing an interfering standing wave in the laser cavity.

12. The system of claim 11, wherein element (d) is a means for directing laser light reflected from the fiber away from the laser so that such reflected light does not re-enter the laser cavity.

13. The system of claim 11, wherein element (d) includes:
(e) means for preventing light which reflects into the cavity from the fiber from establishing the interfering standing wave.

14. The system of claim 13, wherein element (e) includes:
(f) means for varying the optical path length between the laser and the fiber.

15. The system of claim 13, wherein element (e) includes:
(g) means for changing the frequency of light propagating between the laser and the fiber.

16. The system of claim 15, wherein element (g) includes an acousto-optical modulator.

17. The system of claim 11, wherein element (c) is a rod-type lens having a front surface for receiving incident laser light and a back surface, and element (b) is an optical fiber having an end surface substantially parallel to and coupled with the back surface of the lens, where the angle between the propagation direction of the laser light received by the lens and the normal to the fiber's end surface has absolute magnitude sufficiently large so that reflected light from the lens-fiber interface will propagate away from the laser cavity and will not re-enter the laser cavity.

18. The system of claim 17, wherein the lens is a graded index rod-type lens.

19. The system of claim 17, wherein the lens is a graded index rod-type lens having length substantially equal to 10 mm, the fiber is a single mode fiber having numerical aperture substantially equal to 0.12, the laser is a single frequency stabilized HeNe laser with a beam diameter of 0.64 mm, and the angle has absolute magnitude not less than five degrees.

20. The system of claim 17, wherein the lens has length W, a beam of laser light having beam diameter X is incident at the lens, and the angle between the propagation direction of the laser light received by the lens and the normal to the fiber's end surface has absolute magnitude not less than the quantity: $[(\text{Arctan}(X/W))/2]$.

21. A system for launching laser light into an optical fiber in a manner maintaining laser frequency stability by preventing laser light reflected from the fiber from establishing an interfering standing wave in the laser cavity, including:
a laser, having a laser cavity, and capable of emitting laser light from the cavity;
a rod-type lens having a front surface, for receiving incident laser light, and a back surface; and
an optical fiber having an end surface and connected to the lens so that the back surface of the lens and the end surface of the fiber are substantially parallel, where the angle between the propagation direction of the laser light received by the lens and the normal to the fiber's end surface has absolute magnitude sufficiently large so that light reflected from the back surface and the end surface will propagate away from the laser cavity and will not re-enter the laser cavity.

22. The system of claim 21, wherein the refractive index profile of the portion of the lens adjacent the back surface matches the refractive index profile of the portion of the fiber adjacent the end surface, so as to reduce the amount of light reflected from the back surface and the end surface.

23. The system of claim 21, also including an adhesive for bonding the back surface of the lens to the end surface of the fiber, and wherein the refractive index of the adhesive matches that of the lens and the fiber.

24. The system of claim 21, wherein the lens is a graded index, rod-type lens.

25. The system of claim 21, also including means for varying the optical path length between the laser and the lens, so as to prevent light reflected into the laser from the back surface and the end surface from establishing an interfering standing wave.

26. The system of claim 21, also including a frequency shifting unit for varying the frequency of light propagating between the laser and the fiber, so as to prevent any light reflected into the laser from the back surface and the end surface from establishing an interfering standing wave.

27. The system of claim 26, wherein the frequency shifting unit includes an acousto-optical modulator.

28. The system of claim 21, wherein the lens is a graded index rod-type lens having length substantially equal to 10 mm, the fiber is a single mode fiber having numerical aperture substantially equal to 0.12, the laser is a single frequency stabilized HeNe laser with a beam diameter of 0.64 mm, and the angle has absolute magnitude not less than five degrees.

* * * * *